US008366088B2

(12) United States Patent
Allen et al.

(10) Patent No.: US 8,366,088 B2
(45) Date of Patent: Feb. 5, 2013

(54) BRACHYTHERAPY AND RADIOGRAPHY TARGET HOLDING DEVICE

(75) Inventors: Melissa Allen, Wilmington, NC (US); William Earl Russell, II, Wilmington, NC (US); David Allan Rickard, Wilmington, NC (US); Jigar Rajendra Shah, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 632 days.

(21) Appl. No.: 12/458,395

(22) Filed: Jul. 10, 2009

(65) Prior Publication Data

US 2011/0006186 A1 Jan. 13, 2011

(51) Int. Cl.
*B23Q 1/25* (2006.01)

(52) U.S. Cl. ........................................... 269/55; 269/71

(58) Field of Classification Search .................... 269/55, 269/71, 95, 166, 287, 137; 248/121, 125.8
See application file for complete search history.

(56) References Cited

U.S. PATENT DOCUMENTS

| | | | |
|---|---|---|---|
| 2,170,535 A * | 8/1939 | Marsden | 81/6 |
| 3,594,275 A | 7/1971 | Ransohoff et al. | |
| 3,649,036 A * | 3/1972 | Harz | 279/2.03 |
| 3,940,318 A | 2/1976 | Arino et al. | |
| 3,955,093 A | 5/1976 | Quinby | |
| 3,998,691 A | 12/1976 | Shikata et al. | |
| 4,196,047 A | 4/1980 | Mitchem et al. | |
| 4,284,472 A | 8/1981 | Pomares et al. | |
| 4,364,898 A | 12/1982 | Meyer et al. | |
| 4,462,956 A | 7/1984 | Boiron et al. | |
| 4,475,948 A | 10/1984 | Cawley et al. | |
| 4,493,813 A | 1/1985 | Loriot et al. | |
| 4,532,102 A | 7/1985 | Cawley | |
| 4,597,936 A | 7/1986 | Kaae | |
| 4,617,985 A | 10/1986 | Triggs et al. | |
| 4,663,111 A | 5/1987 | Kim et al. | |
| 4,729,903 A | 3/1988 | McGovern et al. | |
| 4,782,231 A | 11/1988 | Svoboda et al. | |
| 4,859,431 A | 8/1989 | Ehrhardt | |
| 5,053,186 A | 10/1991 | Vanderheyden et al. | |
| 5,145,636 A | 9/1992 | Vanderhevden et al. | |
| 5,355,394 A | 10/1994 | Van Geel et al. | |
| 5,400,375 A | 3/1995 | Suzuki et al. | |
| 5,513,226 A | 4/1996 | Baxter et al. | |
| 5,596,611 A | 1/1997 | Ball | |
| 5,615,238 A | 3/1997 | Wiencek et al. | |
| 5,633,900 A | 5/1997 | Hassal | |

(Continued)

OTHER PUBLICATIONS

European Search Report dated May 3, 2012 issued in Application No. 10168515.4-2208/2273509.

*Primary Examiner* — Lee D Wilson

(74) *Attorney, Agent, or Firm* — Harness, Dickey & Pierce, P.L.C.

(57) ABSTRACT

A target holding device according to an embodiment of the invention includes a plurality of target plates, each target plate having a first surface and an opposing second surface, wherein the first surface has a plurality of holes. A shaft may be used to facilitate the alignment and joinder of the target plates such that the first surface of one target plate contacts a second surface of an adjacent target plate. The target holding device may optionally include end plates arranged to sandwich the target plates therebetween and/or separator plates alternately arranged with the target plates. The target holding device may be used to produce brachytherapy and/or radiography targets (e.g., seeds, wafers) in a reactor core such that the targets have relatively uniform activity.

18 Claims, 8 Drawing Sheets

U.S. PATENT DOCUMENTS

| | | | | |
|---|---|---|---|---|
| 5,682,409 | A | 10/1997 | Caine | |
| 5,707,053 | A * | 1/1998 | Plunkett et al. | 269/49 |
| 5,758,254 | A | 5/1998 | Kawamura et al. | |
| 5,829,739 | A * | 11/1998 | Hofmann | 269/43 |
| 5,867,546 | A | 2/1999 | Hassal | |
| 5,871,708 | A | 2/1999 | Park et al. | |
| 5,910,971 | A | 6/1999 | Ponomarev-Stepnoy et al. | |
| 6,056,929 | A | 5/2000 | Hassal | |
| 6,160,862 | A | 12/2000 | Wiencek et al. | |
| 6,192,095 | B1 | 2/2001 | Sekine et al. | |
| 6,233,299 | B1 | 5/2001 | Wakabayashi | |
| 6,456,680 | B1 | 9/2002 | Abalin et al. | |
| 6,678,344 | B2 | 1/2004 | O'Leary et al. | |
| 6,751,280 | B2 | 6/2004 | Mirzadeh et al. | |
| 6,804,319 | B1 | 10/2004 | Mirzadeh et al. | |
| 6,895,064 | B2 | 5/2005 | Ritter | |
| 6,896,716 | B1 | 5/2005 | Jones, Jr. | |
| 7,017,253 | B1 * | 3/2006 | Riggle | 29/468 |
| 7,157,061 | B2 | 1/2007 | Meikrantz et al. | |
| 7,235,216 | B2 | 6/2007 | Kiselev et al. | |
| 7,641,156 | B2 * | 1/2010 | Medders et al. | 248/125.8 |
| 7,798,479 | B1 * | 9/2010 | Meeks et al. | 269/17 |
| 7,934,710 | B2 * | 5/2011 | Chiu | 269/24 |
| 2002/0034275 | A1 | 3/2002 | Abalin et al. | |
| 2002/0114420 | A1 | 8/2002 | O'Leary et al. | |
| 2003/0012325 | A1 | 1/2003 | Kernert et al. | |
| 2003/0016775 | A1 | 1/2003 | Jamriska, Sr. et al. | |
| 2003/0103896 | A1 | 6/2003 | Smith | |
| 2003/0179844 | A1 | 9/2003 | Filippone | |
| 2003/0227991 | A1 | 12/2003 | Kang et al. | |
| 2004/0091421 | A1 | 5/2004 | Aston et al. | |
| 2004/0105520 | A1 | 6/2004 | Carter | |
| 2004/0196942 | A1 | 10/2004 | Mirzadeh et al. | |
| 2004/0196943 | A1 | 10/2004 | Di Caprio | |
| 2005/0105666 | A1 | 5/2005 | Mirzadeh et al. | |
| 2005/0118098 | A1 | 6/2005 | Vincent et al. | |
| 2006/0062342 | A1 | 3/2006 | Gonzalez Lepera et al. | |
| 2006/0126774 | A1 | 6/2006 | Kim et al. | |
| 2007/0133731 | A1 | 6/2007 | Fawcett et al. | |
| 2007/0133734 | A1 | 6/2007 | Fawcett et al. | |
| 2007/0297554 | A1 | 12/2007 | Lavie et al. | |
| 2008/0031811 | A1 | 2/2008 | Ryu et al. | |
| 2008/0076957 | A1 | 3/2008 | Adelman | |
| 2009/0135990 | A1 | 5/2009 | Poon et al. | |

* cited by examiner

BRACHYTHERAPY AND RADIOGRAPHY TARGET HOLDING DEVICE

BACKGROUND

1. Field

The present application relates to devices used for the production of brachytherapy and radiography targets.

2. Description of Related Art

Brachytherapy seeds are conventionally produced from non-irradiated wires (e.g., non-irradiated iridium wires) that are subsequently provided with the desired activity. The desired activity may be provided thereto through neutron absorption by a nuclear reactor.

Brachytherapy seeds have also been produced from irradiated wires. With regard to the production of the seeds, the irradiation of long wires has been suggested, wherein the irradiated wires are subsequently cut and encapsulated into individual seeds. However, because of flux variations in a reactor, the attainment of seeds with uniform activity is difficult.

SUMMARY

A target holding device according to an embodiment of the invention may include a plurality of target plates, each target plate having a first surface and an opposing second surface. The first surface has a plurality of holes, and the target plates are arranged such that the first surface of one target plate contacts a second surface of an adjacent target plate. The target holding device may further include sectional markings on the first surface of each target plate. The target plates may be formed of different materials having low cross sections relative to that of targets held by the device. The target holding device may further include end plates arranged to sandwich the target plates therebetween.

The target holding device may further include one or more shafts passing through at least one of the target plates to facilitate aligning and joining the plurality of target plates. The shaft may pass through a center of each of the target plates. The shaft may have threaded ends and a smooth body therebetween.

A target holder assembly may include the above-discussed target holding device and a cable connected to the target holding device. The cable has sufficient rigidity to facilitate an introduction of the target holding device into a reactor core, sufficient strength to facilitate a retrieval of the target holding device from the reactor core, and sufficient flexibility to maneuver the target holding device through piping turns. The cable may be marked at a predefined length, the predefined length corresponding to a distance from a reference point to a predetermined location within the reactor core.

A target holding device according to another embodiment of the invention may include a plurality of target plates and one or more separator plates. Each target plate has a plurality of holes, and each target plate contacts at least one adjacent separator plate to define compartments for holding targets therein. The target plates may be alternately arranged with the separator plates so as to be sandwiched by the separator plates. The target holding device may further include sectional markings on each target plate. The target plates and separator plates may be formed of different materials having low cross sections relative to that of targets held by the device. The target holding device may further include end plates arranged to sandwich the target plates and separator plates therebetween.

The target holding device may further include one or more shafts passing through at least one of the target plates and separator plates to facilitate aligning and joining the target plates and separator plates. The shaft may pass through a center of each of the target plates and separator plates. The shaft may have threaded ends and a smooth body therebetween.

A target holder assembly may include the above-discussed target holding device and a cable connected to the target holding device. The cable has sufficient rigidity to facilitate an introduction of the target holding device into a reactor core, sufficient strength to facilitate a retrieval of the target holding device from the reactor core, and sufficient flexibility to maneuver the target holding device through piping turns. The cable may be marked at a predefined length, the predefined length corresponding to a distance from a reference point to a predetermined location within the reactor core.

A target holding device according to another embodiment of the invention may include one or more target plates formed of a material having a low cross section of about 10 barns or less, one or more separator plates, and a shaft passing through at least one of the target plates and separator plates. Each target plate has a plurality of holes, and each target plate contacts at least one adjacent separator plate to define compartments for holding targets therein.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
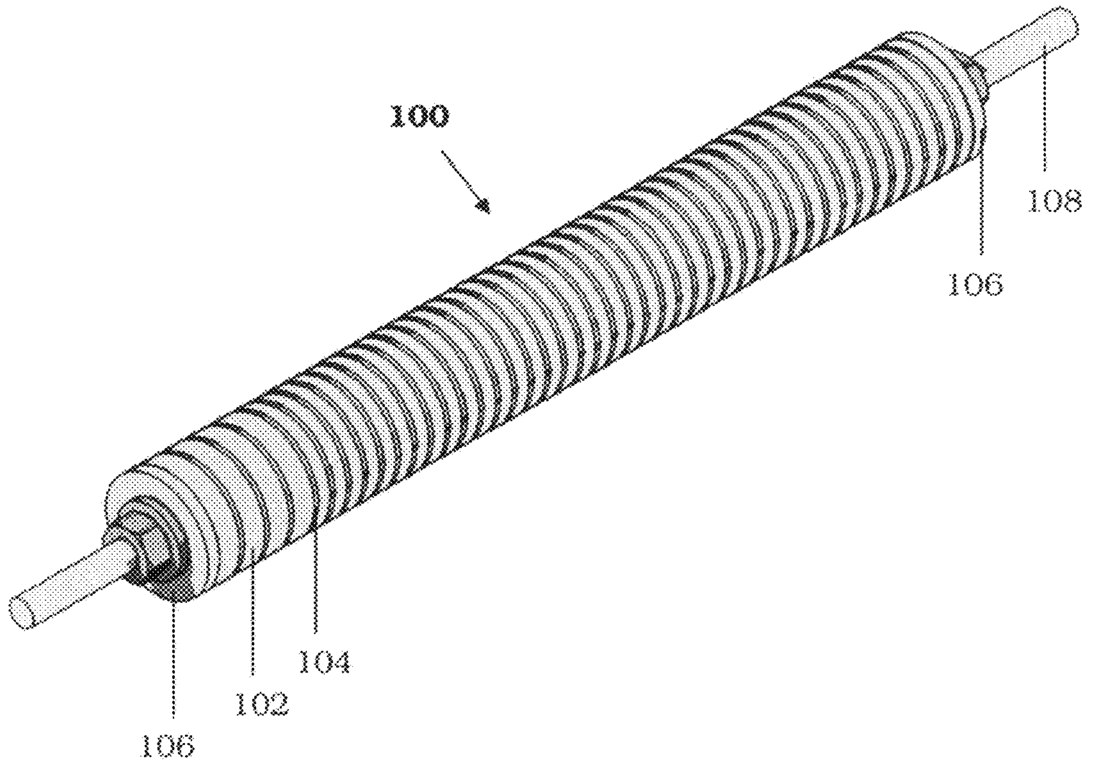
FIG. 1 is a perspective view of a target holding device according to an embodiment of the invention.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

A target holding device and assembly according to the present invention enables the production of brachytherapy and/or radiography targets (e.g., seeds, wafers) in a reactor core such that the targets have relatively uniform activity. The targets may be used in the treatment of cancer (e.g., breast cancer, prostate cancer). For example, during cancer treatment, multiple targets (e.g., seeds) may be placed in a tumor. As a result, targets having relatively uniform activity will provide the intended amount of radiation so as to destroy the tumor without damaging surrounding tissues. The method of producing such targets is described in further detail in "METHOD OF GENERATING SPECIFIED ACTIVITIES WITHIN A TARGET HOLDING DEVICE", filed concurrently herewith, the entire contents of which are incorporated herein by reference.

Figure 2:
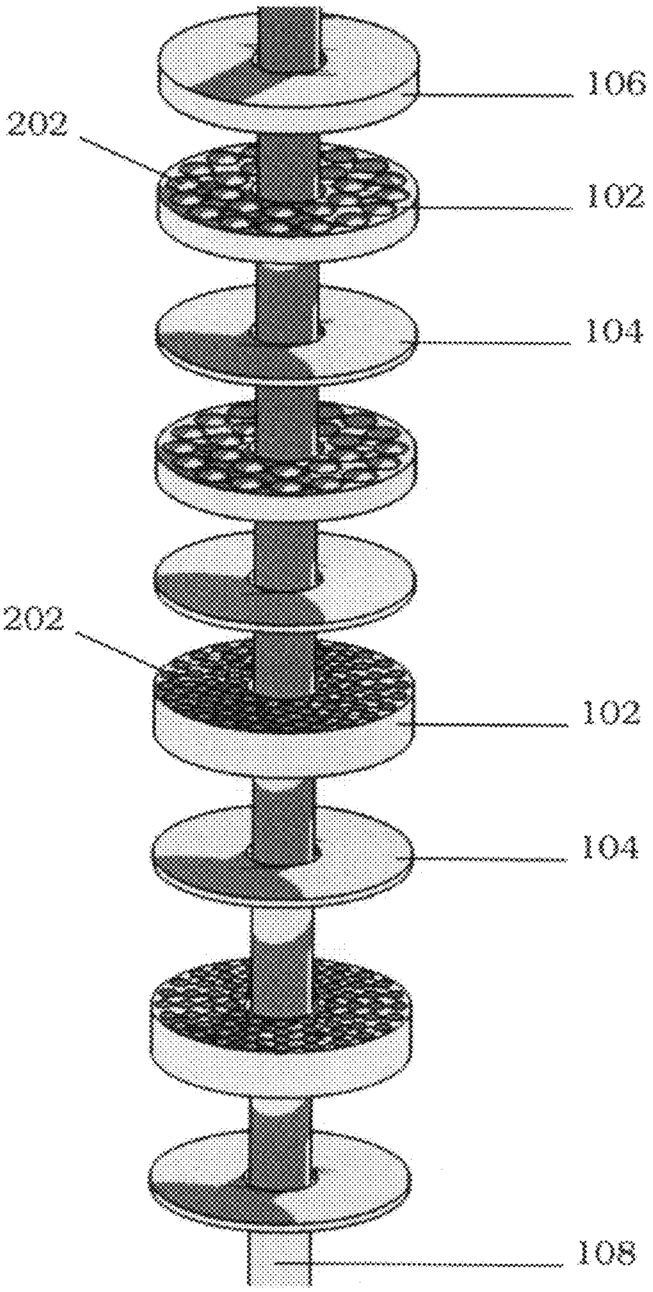
FIG. 2 is a partially exploded view of a target holding device according to an embodiment of the invention.

FIG. 1 is a perspective view of a target holding device according to an embodiment of the invention. FIG. 2 is a partially exploded view of a target holding device according to an embodiment of the invention. Referring to FIGS. 1-2, the target holding device 100 includes a plurality of target plates 102 and a plurality of separator plates 104, wherein the plurality of target plates 102 and the plurality of separator plates 104 are alternately arranged. The thickness of each of the target plates 102 may be varied as needed to accommodate for the size of the intended targets to be contained therein. Thus, although the lower target plates 102 are shown as being thicker than the upper target plates 102, the opposite may be true or the target plates 102 may all be of the same thickness. Furthermore, although the target plates 102 are shown as having the same diameter, the target plates 102 may have different diameters (e.g., tapering arrangement) based on reactor conditions and/or intended targets.

The alternately arranged target plates 102 and separator plates 104 are sandwiched between a pair of end plates 106. A shaft 108 passes through the end plates 106 and the alternately arranged target plates 102 and separator plates 104 to facilitate the alignment and joinder of the plates. The joinder of the end plates 106 and the alternately arranged target plates 102 and separator plates 104 may be secured with a nut and washer arrangement although other suitable fastening mechanisms may be used. Furthermore, although the target holding device 100 is shown as having a single shaft 108, it should be understood that a plurality of shafts 108 may be employed.

As shown in FIG. 2, each target plate 102 has a plurality of holes/compartments 202 in addition to the central hole for the shaft 108. The plurality of holes 202 may be provided in various sizes and configurations depending on production requirements. Although the upper and lower target plates 102 are shown as having holes 202 of different sizes and configurations, it should be understood that all the target plates 102 may have holes 202 of the same size and/or configuration.

The plurality of holes 202 may extend partially or completely through each target plate 102. When the holes 202 are provided such that they only extend partially through each target plate 102, the separator plates 104 may be omitted. In such a case, an upper surface of a target plate 102 would directly contact a lower surface of an adjacent target plate 102. On the other hand, when the holes 202 are provided such that they extend completely through the target plates 102, the separator plates 104 are placed between the target plates 102 so as to separate the holes 202 of each target plates 102, thereby defining a plurality of individual compartments within each target plate 102 for holding one or more targets (e.g., seeds, wafers) therein. The targets may have appropriate shapes or geometries for brachytherapy or radiography and may be formed of chromium (Cr), copper (Cu), erbium (Er), germanium (Ge), gold (Au), holmium (Ho), iridium (Ir), lutetium (Lu), palladium (Pd), samarium (Sm), thulium (Tm), ytterbium (Yb), and/or yttrium (Y), although other suitable materials may also be used.

Figure 3:
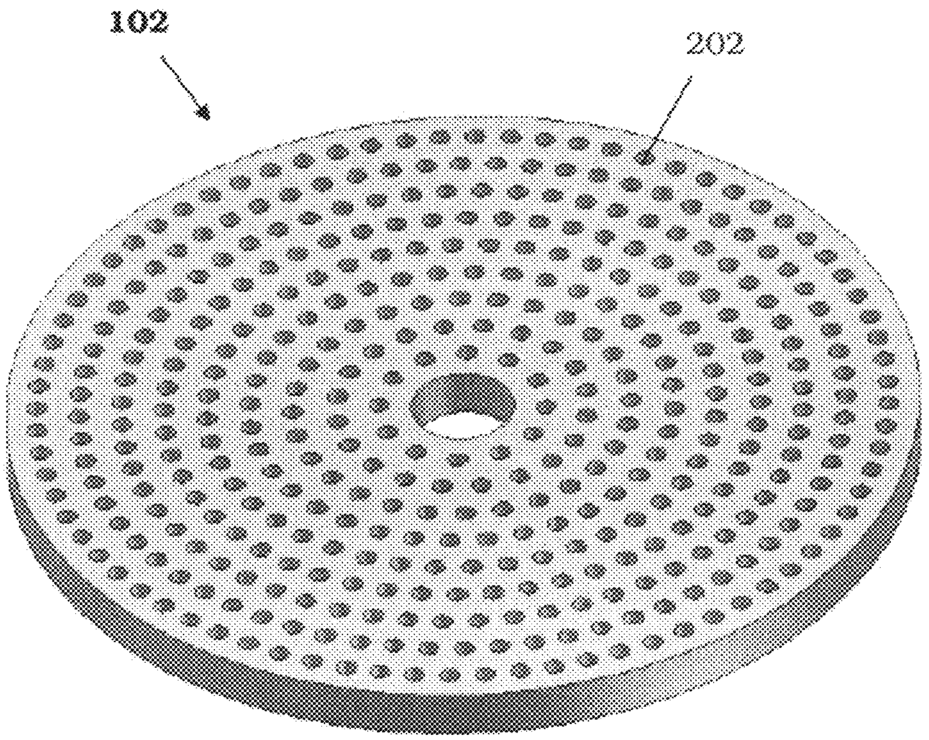
FIG. 3 is a perspective view of a target plate according to an embodiment of the invention.

FIG. 3 is a perspective view of a target plate according to an embodiment of the invention. Referring to FIG. 3, the target plate 102 has a plurality of holes 202 for holding one or more targets (e.g., seeds, wafers) therein during production. The target plate 102 may be formed of a relatively low cross-section material (e.g., aluminum, molybdenum, graphite, zirconium) to allow a higher amount of flux to reach the targets contained therein. For instance, the material may have a cross-section of about 10 barns or less. Alternatively, the target plate 102 may be formed of a neutron moderator material (e.g., beryllium, graphite). Furthermore, the use of materials of relatively high purity may confer the added benefit of lower radiation exposure to personnel as a result of less impurities being irradiated during target production.

The upper and lower surfaces of the target plate 102 may be polished so as to be relatively smooth and flat. The thickness of the target plate 102 may be varied to accommodate the targets to be contained therein. Although the target plate 102 is illustrated as being disc-shaped, it should be understood that the target plate 102 may have a triangular shape, a square shape, or other suitable shape. Additionally, it should be understood that the size and/or configuration of the holes 202 may be varied based on production requirements. Furthermore, although not shown, the target plate 102 may include one or more alignment markings on the side surface to assist with the orientation of the target plate 102 during the stacking step of assembling the target holding device 100.

Figure 4:
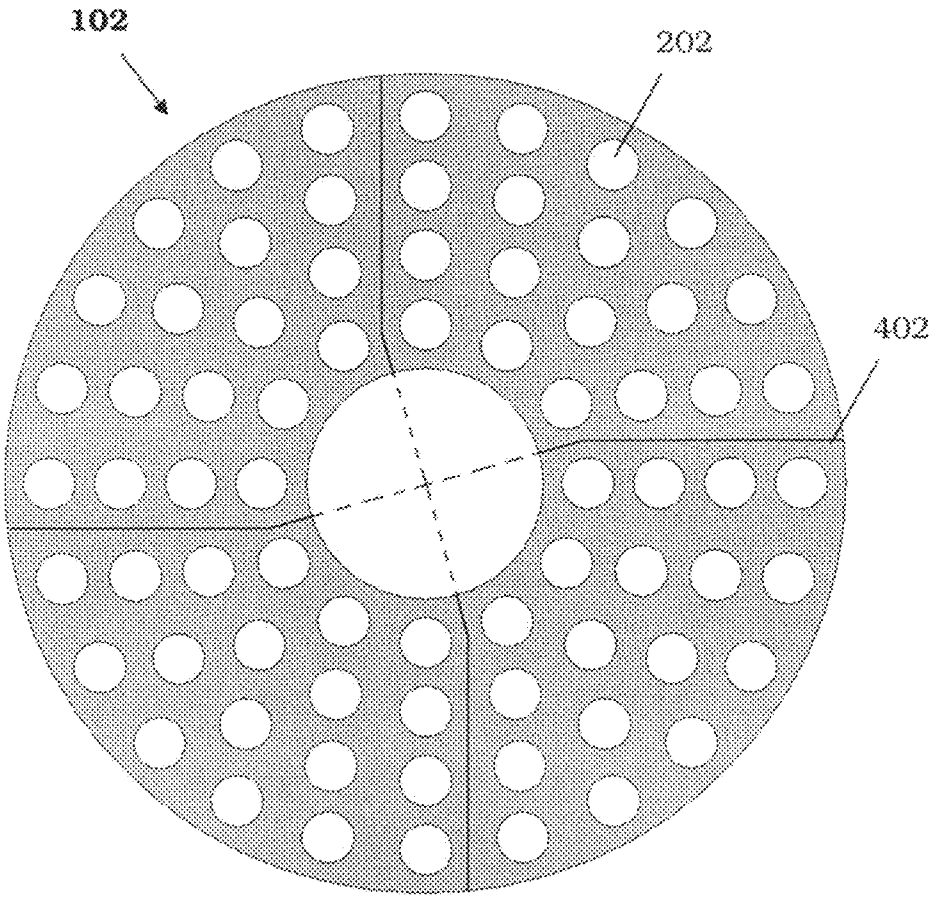
FIG. 4 is a plan view of a target plate according to an embodiment of the invention.

FIG. 4 is a plan view of a target plate according to an embodiment of the invention. Referring to FIG. 4, in addition to having a plurality of holes 202, the target plate 102 may also have sectional markings 402 to assist in the identification of each hole 202, thereby also facilitating the placement of one or more targets within the holes 202. Although the holes 202 are illustrated as extending completely through the target plate 102, it should be understood, as discussed above, that the holes may only extend partially through the target plate 102. Additionally, although the sectional markings 402 are illustrated as dividing the target plate 102 into quadrants, it should be understood that the sectional markings 402 may be alternatively provided so as to divide the target plate 102 into more or less sections. Furthermore, it should be understood that the sectional markings 402 may be linear, curved, or otherwise provided to accommodate the configuration of the holes 202 in the target plate 102.

Figure 5:
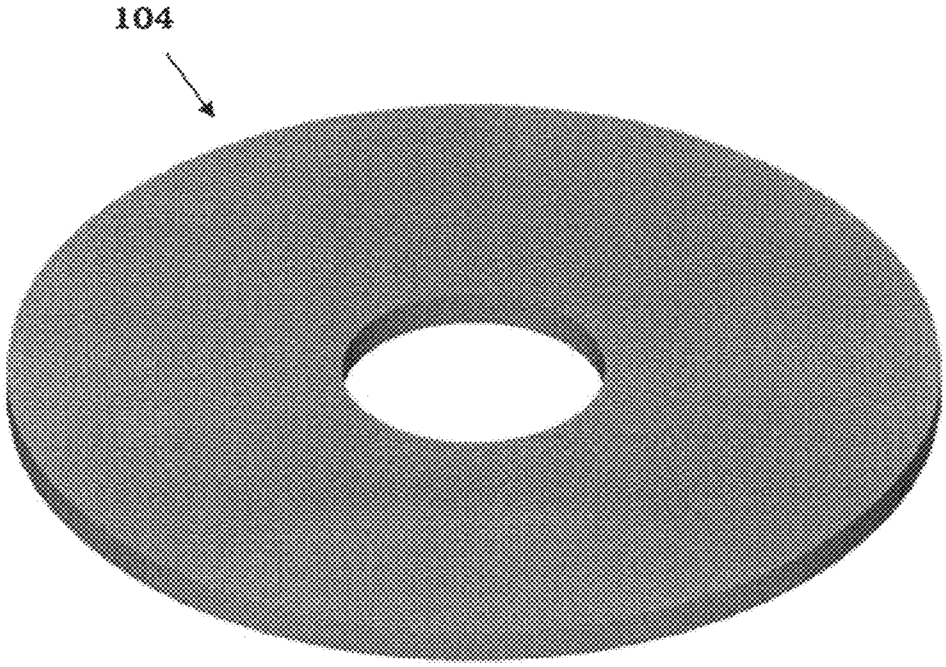
FIG. 5 is a perspective view of a separator plate according to an embodiment of the invention.

FIG. 5 is a perspective view of a separator plate according to an embodiment of the invention. As discussed above, a plurality of separator plates 104 may be alternately arranged with a plurality of target plates 102 in a target holding device 100. The separator plate 104 may be formed of a relatively low cross-section material (e.g., aluminum, molybdenum, graphite) or a neutron moderator material (e.g., beryllium, graphite). Furthermore, the material may be of relatively high purity.

The upper and lower surfaces of the separator plate 104 may be polished so as to be relatively smooth and flat. The thickness of the separator plate 104 may be decreased to allow for a greater number of target plates 102 to be included in the target holding device 100. On the other hand, the thickness of the separator plate 104 may be increased to space out the targets contained in the holes 202 of the target plate 102 during production, thereby increasing the specific activity of the targets. Although the separator plate 104 is illustrated as being disc-shaped, it should be understood that the separator plate 104 may have a triangular shape, a square shape, or other suitable shape so as to correspond to the shape of the target plate 102.

Figure 6:
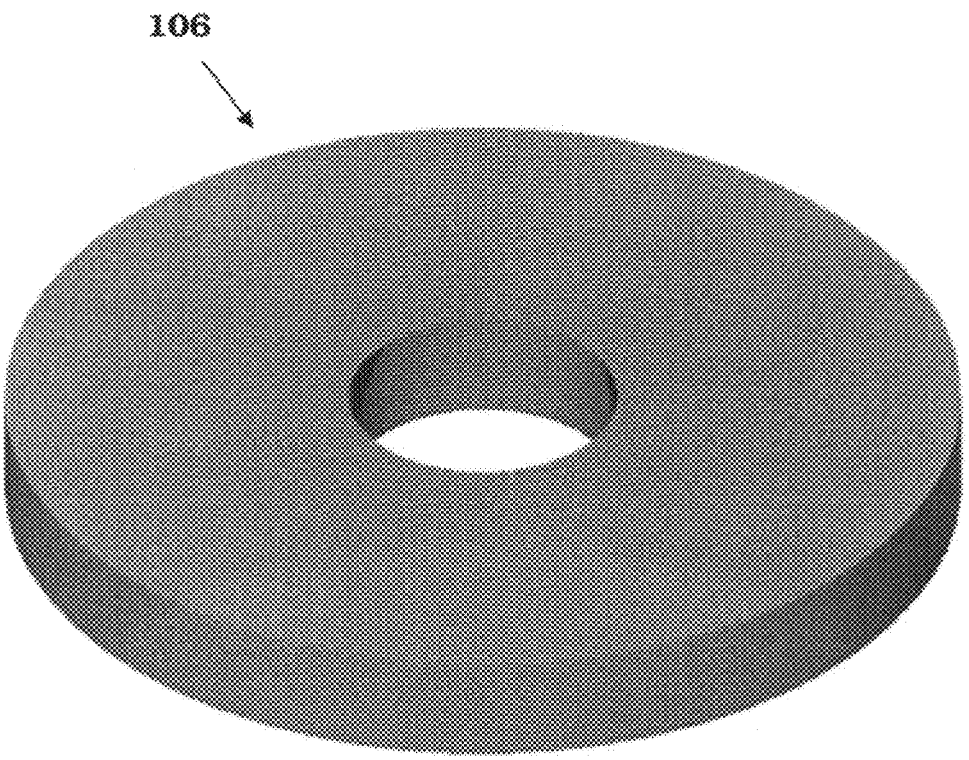
FIG. 6 is a perspective view of an end plate according to an embodiment of the invention.

FIG. 6 is a perspective view of an end plate according to an embodiment of the invention. As discussed above, a pair of end plates 106 may be used to sandwich a plurality of alternately arranged target plates 102 and separator plates 104. The end plate 106 may be formed of a relatively low cross-section material (e.g., aluminum, molybdenum, graphite) or a neutron moderator material (e.g., beryllium, graphite). Furthermore, the material may be of relatively high purity. The upper and lower surfaces of the end plate 106 may be polished so as to be relatively smooth and flat. Although the end plate 106 is illustrated as being disc-shaped, it should be understood that the end plate 106 may have a triangular shape, a square shape, or other suitable shape so as to correspond to the shape of the target plate 102.

Figure 7:
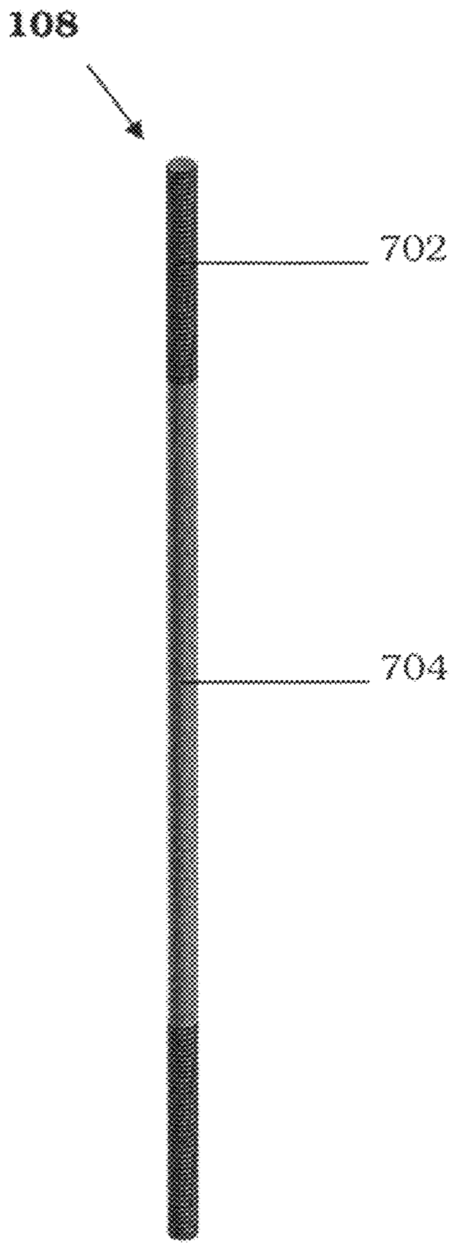
FIG. 7 is a perspective view of a shaft according to an embodiment of the invention.

FIG. 7 is a perspective view of a shaft according to an embodiment of the invention. Referring to FIG. 7, the shaft 108 has a relatively smooth middle portion 704 and threaded ends 702. As discussed above, the shaft 108 may be used to facilitate the alignment and joinder of the end plates 106 and the alternately arranged target plates 102 and separator plates 104. The threaded ends 702 of the shaft 108 allow the use of a nut and washer arrangement to secure the joinder of the plates, although other suitable fastening mechanisms may be used. Although the shaft 108 is illustrated as having a cylindrical shape, it should be understood that the shaft 108 may alternatively have a polygonal (e.g., rectangular) shape. A shaft 108 with a polygonal shape may further assist with the alignment of the plates by precluding the rotation of the plates relative to the shaft 108.

Figure 8:
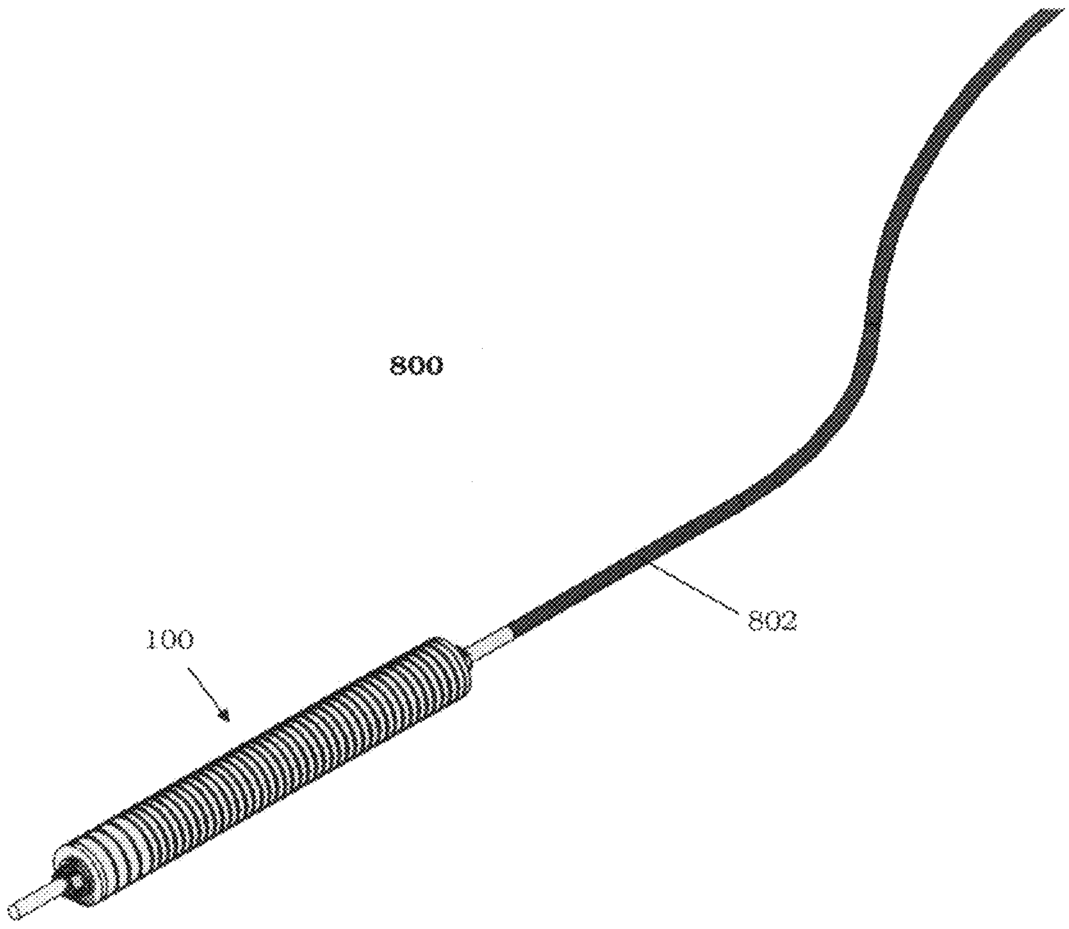
FIG. 8 is a perspective view of a target holder assembly according to an embodiment of the invention.

FIG. 8 is a perspective view of a target holder assembly according to an embodiment of the invention. Referring to FIG. 8, the target holder assembly 800 includes a target holding device 100 connected to a cable 802. The cable 802 may be formed of any material having sufficient rigidity to facilitate the introduction of the target holding device 100 into a reactor core, sufficient strength to facilitate the retrieval of the target holding device 100 from the reactor core, and sufficient flexibility to maneuver the target holding device 100 through piping turns. For instance, the cable 802 may be a braided steel cable or a flexible electrical conduit cable. To assist with the introduction of the target holding device 100 into a reactor core, the cable 802 may be marked at a predefined length, wherein the predefined length corresponds to a distance from a reference point to a predetermined location within the reactor core.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A target holder assembly, comprising:

a plurality of target plates, each target plate having a first surface and an opposing second surface, the first surface having a plurality of holes, the target plates arranged such that the first surface of one target plate contacts a second surface of an adjacent target plate; and a cable connected to the target holding device, the cable having sufficient rigidity to facilitate an introduction of the target holding device into a reactor core, sufficient strength to facilitate a retrieval of the target holding device from the reactor core, and sufficient flexibility to maneuver the target holding device through piping turns.

2. The assembly of claim 1, further comprising:

one or more shafts passing through at least one of the target plates to facilitate aligning and joining the plurality of target plates.

3. The assembly of claim 2, wherein the shaft passes through a center of each of the target plates.

4. The assembly of claim 2, wherein the shaft has threaded ends and a smooth body therebetween.

5. The assembly of claim 1, further comprising:

end plates arranged to sandwich the target plates therebetween.

6. The assembly of claim 1, wherein the cable is marked at a predefined length, the predefined length corresponding to a distance from a reference point to a predetermined location within the reactor core.

7. The assembly of claim 1, further comprising:

sectional markings on the first surface of each target plate.

8. The assembly of claim 1, further comprising:

one or more targets in the plurality of holes of the target plates, the targets being in the form of brachytherapy or radiography geometries.

9. A target holder assembly, comprising:

a plurality of target plates, each target plate having a plurality of holes;

one or more separator plates, each target plate contacting at least one adjacent separator plate to define compartments for holding targets therein; and a cable connected to the target holding device, the cable having sufficient rigidity to facilitate an introduction of the target holding device into a reactor core, sufficient strength to facilitate a retrieval of the target holding device from the reactor core, and sufficient flexibility to maneuver the target holding device through piping turns.

10. The assembly of claim 9, wherein the target plates are alternately arranged with the separator plates so as to be sandwiched by the separator plates.

11. The assembly of claim 9, further comprising:

one or more shafts passing through at least one of the target plates and separator plates to facilitate aligning and joining the target plates and separator plates.

12. The assembly of claim 11, wherein the shaft passes through a center of each of the target plates and separator plates.

13. The assembly device of claim 11, wherein the shaft has threaded ends and a smooth body therebetween.

14. The assembly of claim 9, further comprising:

end plates arranged to sandwich the target plates and separator plates therebetween.

15. The assembly of claim 9, wherein the cable is marked at a predefined length, the predefined length corresponding to a distance from a reference point to a predetermined location within the reactor core.

16. The assembly of claim 9, further comprising:

sectional markings on each target plate.

17. The assembly of claim 9, wherein the target plates and separator plates are formed of different materials having low cross sections relative to that of targets held by the device.

18. A target holder assembly, comprising:

one or more target plates formed of a material having a low cross section of about 10 barns or less, each target plate having a plurality of holes;

one or more separator plates, each target plate contacting at least one adjacent separator plate to define compartments for holding targets therein;

a shaft passing through at least one of the target plates and separator plates; and a cable connected to the target holding device, the cable having sufficient rigidity to facilitate an introduction of the target holding device into a reactor core, sufficient strength to facilitate a retrieval of the target holding device from the reactor core, and sufficient flexibility to maneuver the target holding device through piping turns.

* * * * *